US005341552A

United States Patent [19]

Voumard

[11] Patent Number: 5,341,552

[45] Date of Patent: Aug. 30, 1994

[54] WATCH WITH WATCHBAND ATTACHMENT

[75] Inventor: Bertrand P. Voumard, Chexbres, Switzerland

[73] Assignee: Isafrance, Villers-le-Lac, France

[21] Appl. No.: 38,078

[22] Filed: Mar. 29, 1993

Related U.S. Application Data

[63] Continuation of Ser. No. 728,143, Jul. 10, 1991, abandoned.

[30] Foreign Application Priority Data

Jul. 13, 1990 [CH] Switzerland ........................ 2346/90

[51] Int. Cl.$^5$ ........................ B23P 19/02; G04D 3/00; G04B 37/16

[52] U.S. Cl. ........................ 29/179; 29/DIG. 37; 368/282

[58] Field of Search ......... 29/177, 178, 179, DIG. 37; 368/280, 281, 282, 294, 296; 72/254, 255, 352, 379.2, 379.4; 968/331, 359, 368, DIG. 1

[56] References Cited

U.S. PATENT DOCUMENTS

| | | | |
|---|---|---|---|
| 1,380,812 | 6/1921 | Lathrop | 29/179 |
| 2,225,474 | 7/1938 | Guild . | |
| 3,242,664 | 3/1966 | Lederrey | 29/179 X |
| 4,034,552 | 7/1977 | Davidson . | |
| 4,417,821 | 11/1983 | Herchenbach . | |
| 4,659,897 | 4/1987 | Takasugi | 29/179 X |
| 4,903,253 | 2/1990 | Nikles et al. . | |
| 5,077,710 | 12/1991 | Gogniat | 72/254 X |

FOREIGN PATENT DOCUMENTS

| | | | |
|---|---|---|---|
| 0052316 | 5/1982 | European Pat. Off. . | |
| 0150746 | 8/1985 | European Pat. Off. . | |
| 0264875 | 4/1988 | European Pat. Off. . | |
| 2530154 | 2/1977 | Fed. Rep. of Germany . | |
| 8136009.6 | 4/1982 | Fed. Rep. of Germany . | |
| 3309409A1 | 9/1984 | Fed. Rep. of Germany . | |
| 57-86776 | 5/1982 | Japan . | |
| 180484 | 10/1984 | Japan | 29/179 |
| 183390 | 10/1984 | Japan | 29/179 |
| 4301586 | 10/1992 | Japan | 29/179 |
| 347490 | 8/1960 | Switzerland . | |
| 355094 | 7/1961 | Switzerland . | |
| 355095 | 7/1961 | Switzerland . | |
| 647123 | 1/1985 | Switzerland . | |

OTHER PUBLICATIONS

Patent Abstracts of Japan, vol. 6, No. 168 (P-139) Nov. 1982.

*Primary Examiner*—Peter Dungba Vo

*Attorney, Agent, or Firm*—Oliff & Berride

[57] ABSTRACT

The caseband (2) of the watchcase (1) comprises one or two hollows (20, 25) for receiving the end of each length of watchband. The ends of the watchband are held by attachments such as claws (30) or recesses (32, 25), matching notches (40) or protuberances (41, 42) situated near the ends of the watchband, and disposed on extensions of the back (3) of the watchcase or on intermediate parts (33, 43, 44, 50, 56) integral with the watchcase back or with the caseband. This arrangement not only facilitates the manufacture and finishing of the watchcase by eliminating any projecting elements which would interfere with production on automatic machines, but also enables the watchband attachment to be made more attractive.

18 Claims, 5 Drawing Sheets

FIG. 1A
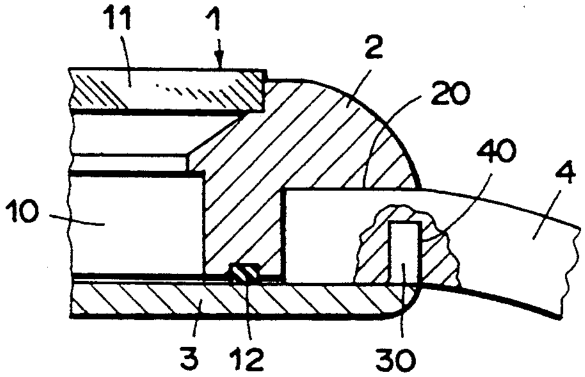
FIG. 1B
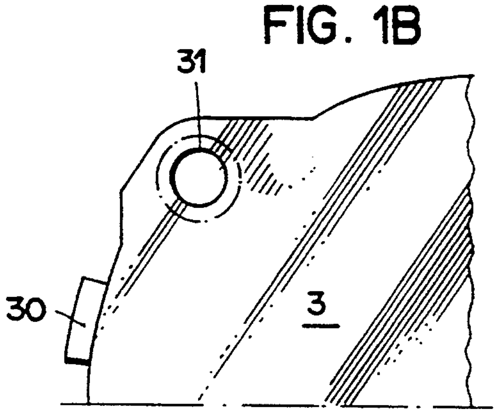
FIG. 2A
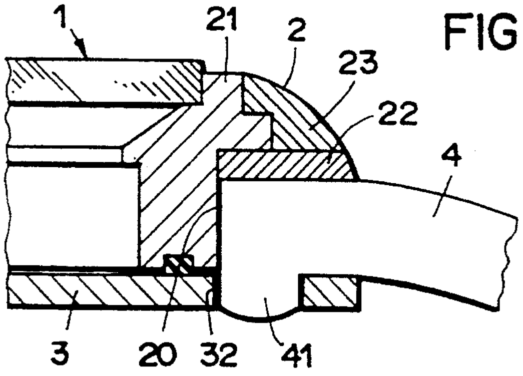
FIG. 1C
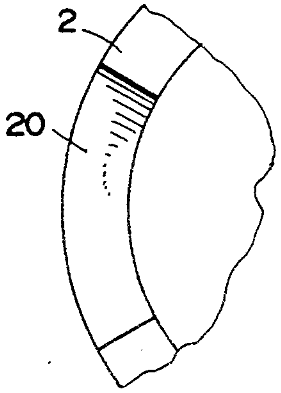
FIG. 3
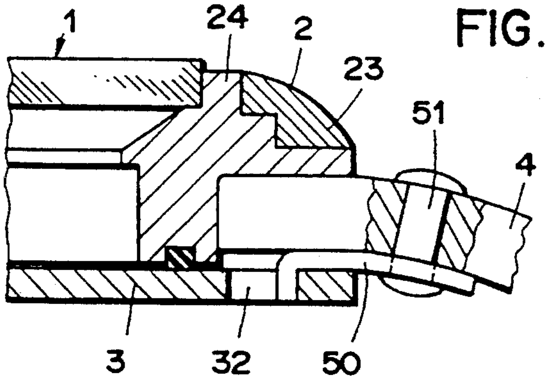
FIG. 2B
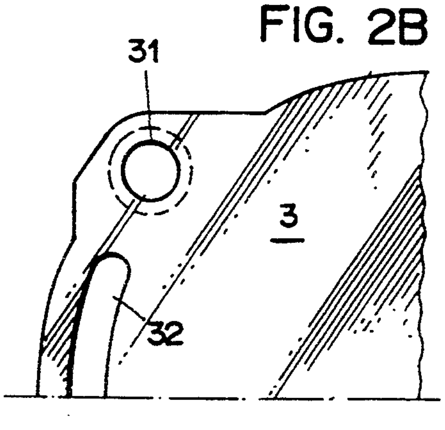
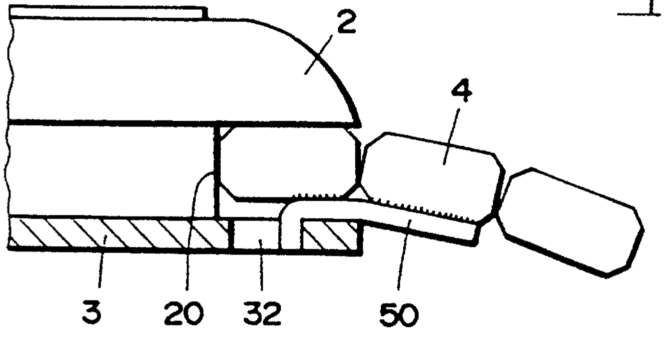
FIG. 4

FIG. 16A
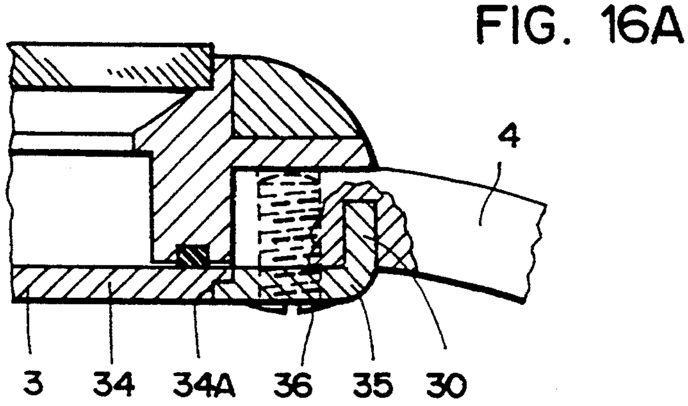
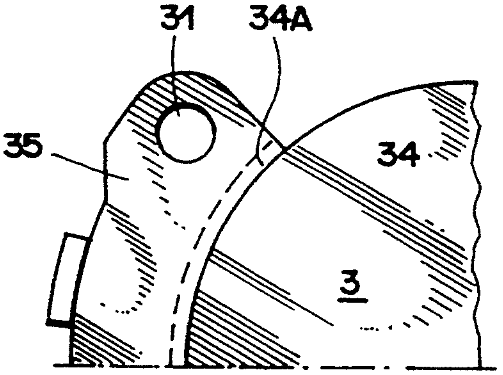
FIG. 16B

WATCH WITH WATCHBAND ATTACHMENT

This is a continuation of application Ser. No. 07/728,143 filed Jul. 10, 1991, now abandoned.

This invention relates to wrist watches, and more particularly to a watch of the type having a watchcase, a watchband, and a device for attaching the watchband to the watchcase.

Devices for attaching a watchband to a watchcase are generally rather complicated, both as to the number of different parts required and as to the complexity of these different parts, as well as the difficulty in machining them. In particular, both the ends of each part of the watchband and the watchcase must be specially shaped and machined in order to be assembled. Moreover, the mounting of these various elements also takes rather a long time and is consequently expensive.

In particular, the system of attachment in current use is based upon the presence of two horns or other projecting elements for each part of the watchband to be fixed to the watchcase; a small transverse bar, the ends of which are fixed to each of these horns, passes through a long hole running across the end of the watchband. These horns or other elements projecting from the periphery of the caseband prevent the automation of numerous machining or finishing operations, thus necessitating extensive and costly manual labor. Conventional watchcases provided with horns or other elements are generally hot-stamped. For that purpose, it is necessary to undertake several stampings in order to permit sufficient flowage, intermediate annealing being required. Moreover, it is impossible to undertake stamping in a closed die, which would permit the avoidance of surpluses of material that will then have to be eliminated by subsequent additional blanking, milling, or turning operations which are long and expensive. Finally, during finishing of the watchcase, the presence of the same horns or other elements prevents having recourse to automatic lapping, faceting, diamond polishing, or other polishing, some of these operations having to be carried out manually in order to avoid damaging the horns or other projecting elements.

These various factors, particularly proper to metal watchcases, considerably increase the cost of the latter.

The same applies to the watchbands, which must be specially fashioned in order to include the long transverse hole intended to receive the small bar for attachment to the horns.

Various prior disclosures show that the watchmaking industry is actively seeking a satisfactory solution to the problem described. Most of these disclosures run up against the necessity of transferring the complexity of machining either to the caseband or to the back of the watchcase. Attachment systems involving casebands and/or backs of watchcases which are difficult to machine are described particularly in Japanese Laid-Open Application No. 57-86,776; U.S. Pat. Nos. 2,225,474, 4,034,552, 4,417,821, and 4,903,253; Swiss Published Applications Nos. 347,490, 355,095, and 647,123; German Utility Model No. 8,136,009; and German Disclosed Application (DOS) No. 33 09094. The watchcase backs described in most of the foregoing disclosures cannot be machined in a single pass and all require machining corrections, which appreciably increases the cost. On the other hand, the system described in German Disclosed Application (DOS) No. 25 30154 is not more satisfactory; machining of the watchcase is very expensive because of the large number of machining and correction operations required. Furthermore, contriving the hollows necessary for holding the ends of the watchband parts requires end-milling operations, which are always delicate. Finally, the watchband parts are not held by the back of the watchcase but are cemented in the hollows, which makes the system non-removable.

It is an object of this invention to provide an improved watchcase having a watchband attachment of very simple design, requiring few parts, the manufacture of which is easy, can be fully automated by conventional means, and needs no correction for the subsequent turning or milling operations.

It is a further object of the invention to provide a watch in which neither the watchcase nor the caseband comprises any horns or other projecting element, thus making it possible to have a completely symmetrical watchcase, wherein the back of the watchcase can be worked in a single pass starting from a strip of sheet metal, and wherein the parts of the watchband, too, are very simple to produce, whereby the cost price of the complete watchcase is considerably reduced.

It is also an object of this invention to provide a watchcase having a watchband attachment which is removable and wherein one or the other of its components, e.g., the watchband, is replaceable in case of wear or of a change in fashion, for instance.

Still another object of this invention is to provide a system of great esthetic value, certain elements of which may easily be transformed or added, depending upon the fashion or the desire of the wearer of the watch.

To this end, in the watch according to the present invention, of the type initially mentioned, the caseband of the watchcase does not comprise any horn or projecting element but rather one or two hollows disposed symmetrically with the lower portion of the caseband, each of these hollows being intended to receive the end of a length of watchband, this end of a watchband length being held in the hollow of the caseband either by attachment means peculiar to the back of the watchcase, this watchcase back being made up of a piece of sheet metal of uniform thickness produced by machining on a single multi-station machine and being fixed to the watchcase by a plurality of screws; or by a small bar comprising one or more claws inserted in notches disposed near the end of a length of watchband, the small bar being fixed to the bottom of the caseband by means of screws; or by a small bar comprising one or more apertures in which are inserted one or more protuberances arranged perpendicularly near the end of a watchband length, this small bar being fixed to the bottom of the caseband by means of screws.

BRIEF DESCRIPTION OF THE DRAWINGS

Preferred embodiments of the invention will now be described in detail with reference to the accompanying drawings, in which:

FIGS. 1A–1C are a cross-section through the watchband attachment, a bottom view of part of the watchcase back, and a bottom view of part of the watchcase, respectively, in a first embodiment of the invention, FIGS. 2A and 2B are a cross-section through the watchband attachment and a bottom view of part of the watchcase, respectively, in a second embodiment, FIGS. 3–8 are sectional views of further embodiments, FIGS. 16A and 16B are a sectional view and a bottom view of part of a modification of the watchcase back, respectively, adapted to the first embodiment.

DESCRIPTION OF PREFERRED EMBODIMENTS

Figure 5:
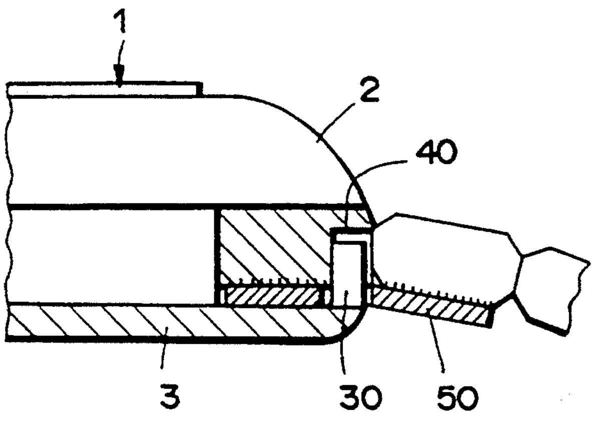

The embodiment illustrated in FIGS. 1A, 1B, and 1C lends itself particularly well to the attachment of a leather, plastic, or metal watchband. A watchcase 1 including a caseband 2 holds a watch movement 10, which may be of any type known in the art, as well as a glass 11. A watchcase back 3 closes watchcase 1 from beneath, fluid-tightness being achieved by means of a gasket 12 disposed in a groove in the bottom of caseband 2. A watchband 4 is attached to watchcase 1. In FIG. 1A, caseband 2 is seen to include a hollow 20, intended to receive the end of a length of watchband 4 and contrived on an annular portion of the bottom of caseband 2. The general shape of hollow 20, cut like a sector of an annulus, may be seen in FIG. 1C. Hollow 20 may also be cut with parallel faces. It will be understood that caseband 2 also includes a second hollow, disposed symmetrically on the other side. It will therefore be noted that caseband 2, unlike other casebands of the prior art, does not comprise any projecting element preventing or hindering its complete machining by automatic means, and particularly cold-stamping in a closed die, the apertures for watchband 4 and the holes for securing back 3 being produced on a linear or circular machine having multi-spindle heads. The end of watchband 4 has a shape adapted to fit into hollow 20 and take up the entire space there. Set slightly back from this end, watchband 4 includes one or more notches 40 occupied by one or more claws 30 consisting of one or more upwardly bent extensions of back 3. Back 3, of uniform thickness, may therefore be easily made from a strip of sheet metal of uniform thickness, for instance, which may be blanked, and claws 30 of which may be bent in a single automatic machining operation, e.g., by a multi-station linear machine. To mount watchband 4, it suffices to insert the ends thereof from below into hollows 20 provided on each side of the watch, notches 40 facing toward the bottom of the watch, then to position back 3 with claws 30 fitting into notches 40, and to screw back 3 to watchcase 1 by means of screws fitting into holes 31 in back 3 (FIG. 1B), then into tapped holes made in watchcase 1 or caseband 2. Owing to the good hold of watchband 4 between claws 30 and the bottom of hollow 20 against which it rests, it is not necessary to reinforce notches 40 of watchband 4.

FIGS. 2A and 2B are views of another embodiment which lends itself very well to the attachment of a plastic watchband. Caseband 2 includes a hollow 20 identical to that described in connection with the preceding embodiment, whereas back 3 no longer comprises claws but rather one or more transverse apertures 32 for receiving one or more protuberances 41 made at the end of the length of watchband 4. It is obvious that in this embodiment, back 3 of watchcase 1 may also be made from a strip of sheet metal by automatic production means. The one or more protuberances 41 are made directly when watchband 4 is molded. As previously, after insertion of the ends of watchband 4 into the hollows 20, with protuberances 41 facing toward the bottom of watchcase 1, it suffices to place back 3 with its apertures 32 surrounding protuberances 41 and to screw it to watchcase 1. A modification of caseband 2 is also shown in FIG. 2A; here, instead of being formed in one piece as before, caseband 2 is composed of three parts: the caseband proper 22, a cartridge or container 21 for the movement, and a decorative ring 23. These three parts may be of metal, ceramics, or plastic—all of the same material or of different materials. They are assembled and secured to one another and to watchcase 1 by means known per se, by driving, setting, or cementing. In particular, decorative ring 23 may be fixed or rotating, in order to displace a movable guide-mark or graduation, or else it may constitute an ornament which can be interchangeable.

The advantage of providing a caseband made up of three separate parts, including particularly a cartridge or container holding the movement, is that it is very easy to insert such a plastic container and requires no additional machining, this container also acting as a gasket for the glass.

Another embodiment is illustrated in FIG. 3. An L-shaped intermediate part 50, the long arm of which is slightly curved and includes a hole, has its short arm inserted in aperture 32 of back 3, while watchband 4 is attached to L-shaped part 50 by a rivet 51 or any other suitable means which holds it to the bottom of the hollow in caseband 2. Also shown in this drawing figure is another modification of caseband 2, made here in two pieces: a caseband proper 24, acting as a cartridge or container as well, and decorative ring 23. As previously, these parts may be of metal or plastic, of the same material or of different materials, ring 23 being fixed, rotating, or interchangeable.

The embodiment illustrated in FIG. 4 lends itself very well to the attachment of a watchband 4 made up of metal links, the last link occupying hollow 20 in caseband 2. An L-shaped intermediate part 50 as in the preceding embodiment has its long arm welded to the undersides of the last and next to last links, while its short arm is fitted in aperture 32 of back 3.

FIG. 5 shows another embodiment for attaching a watchband made of metal links. The last link, which may be of plastic or metal, comprises a notch 40 for receiving a claw 30 made, as above, on an extension of back 3. An intermediate part 50, also held by claw 30, is welded to the undersides of the last and next to last links of the watchband in order to reinforce them.

Figure 6:
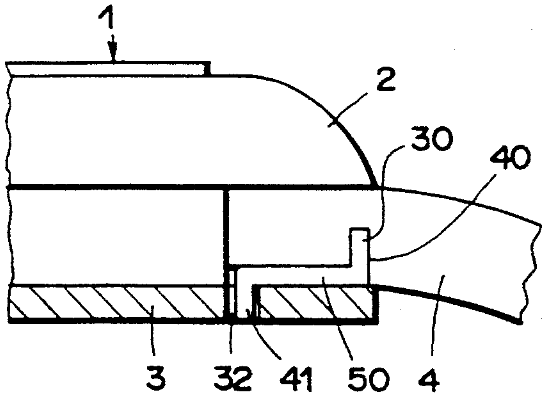

In FIG. 6, the embodiment shown is a juxtaposition of the first and second embodiments described above. An intermediate part 56 has two opposing flanges, one of which is used like claw 30, fitting in notch 40 of watchband 4, and the other inserted in aperture of back 3, like protuberance 41.

Figure 7:
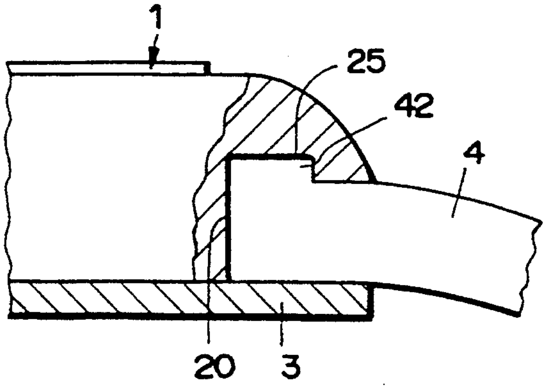

The embodiment of FIG. 7 lends itself well to a plastic watchband 4. The end of the latter comprises a protuberance 42 positioned at the back of hollow 20, which in turn comprises a second hollow 25 for holding protuberance 42. In this embodiment, back 3 is flat, comprising neither claws nor holding apertures.

Figure 8:
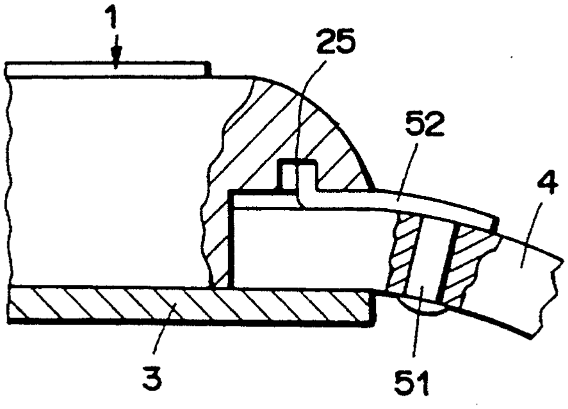

The embodiment illustrated in FIG. 8 is derived from the preceding one and enables its adaptation to a leather watchband 4: a holding part 52 comprises a small flange seated in second hollow 25 and an elongated, slightly bent body fixed to watchband 4 by any suitable means, e.g., with the aid of a rivet 51. Since a portion of this holding part 52 is visible above watchband 4, that portion is intended to have an attractive appearance.

Figure 9A:
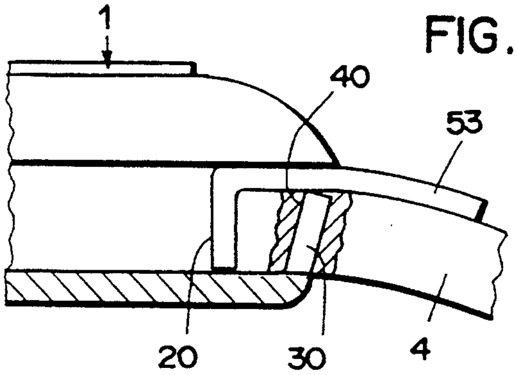
FIGS. 9A and 9B are a cross-section and a top plan view, respectively, of another embodiment.
Figure 9B:
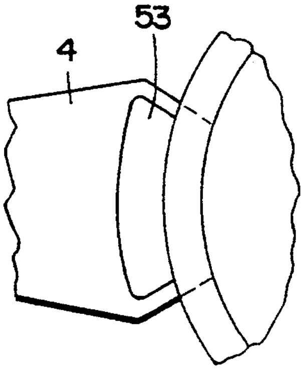

FIGS. 9A and 9B show an embodiment derived from the first embodiment. Claw or claws 30 pass completely through watchband 4 in perforating notches 40, and an attractive covering plate 53, held in hollow 20 by a bent one of its ends, hides the ends of the claw or claws 30. An example of the attractive appearance which covering plate 53 may present on watchband 4 is seen in FIG. 9B.

Figure 10:
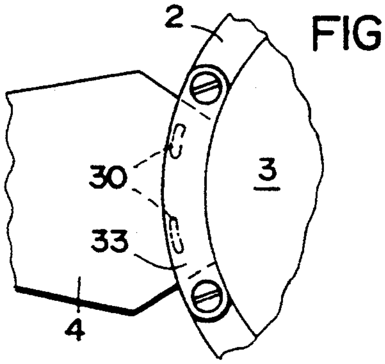
FIGS. 10 and 11 are bottom views of other embodiments.
Figure 11:
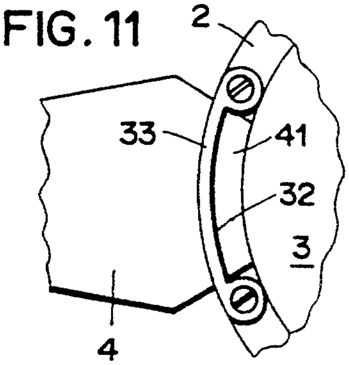

FIGS. 10 and 11 show two different embodiments in which claws 30 (FIG. 10) or apertures 32 (FIG. 11) are not made on an extended portion of back 3 but on a small bar 33 fixed to the bottom of caseband 2 by two screws. In this way, back 3 of watchcase 1 is absolutely circular and can be screwed into watchcase 1 by means of an external thread in order to be fixed to caseband 2 or to the container by sealing or securing means known per se.

Figure 12A:
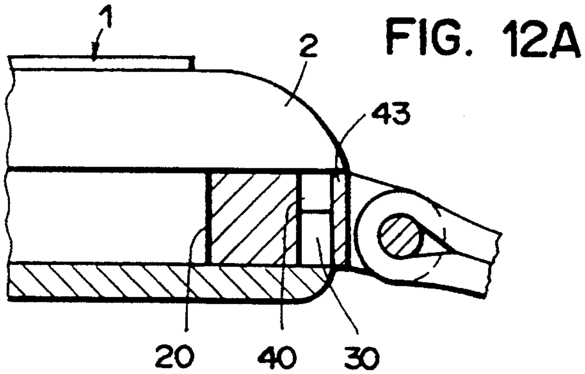
FIGS. 12A and 12B are a sectional view through another embodiment and a top plan view of a component part thereof, respectively.
Figure 12B:
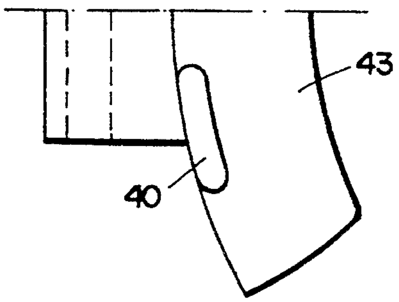
Figure 13A:
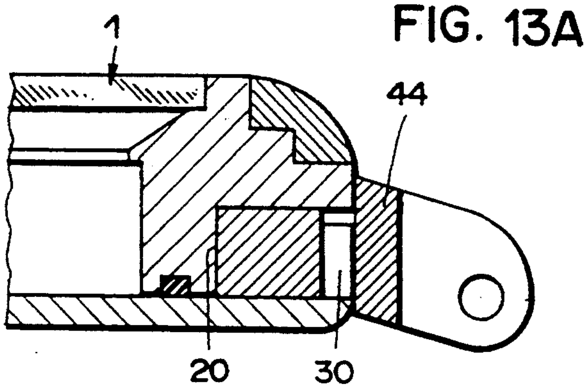
FIGS. 13A and 13B are views, respectively analogous to FIGS. 12A and 12B, of a further embodiment.
Figure 13B:
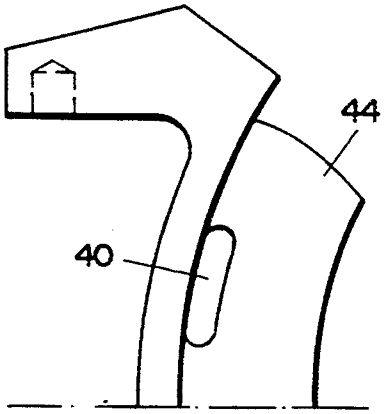

If, because of marketing or fashion demands, it is desired to revert to a conventional attachment system by means of horns or lugs, the embodiments of FIGS. 12 and 13 may be adopted. In FIGS. 12A and 12B, there is an intermediate attachment part 43, a first portion of which is seated in hollow 20 and held by claws 30 in notches 40 made in this first portion, while the second portion is in the form of a cord-lug, permitting the attachment of any watchband designed to be attached by that conventional technique. An attachment part 44 shown in FIGS. 13A and 13B is similar to the preceding one, except that its second portion includes two horns permitting the attachment of any watchband designed to be attached by that conventional technique.

It will be readily understood that intermediate parts 43 and 44, described above as including notches 40 to receive claws 30, may equally well be made with protuberances to be accommodated in apertures of the back. Likewise, although the cord-lug attachment system is shown with a single cord-lug, any lug attachment system, possibly including several lugs, may be envisaged.

Figure 14A:
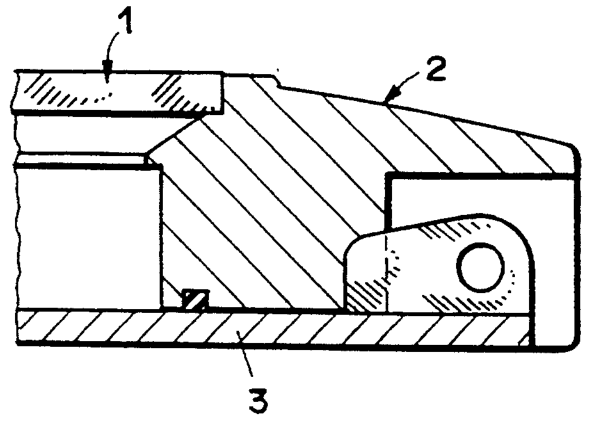
FIGS. 14A and 14B are a sectional view through a further embodiment and a bottom view of part of the back of the watchcase, respectively.
Figure 14B:
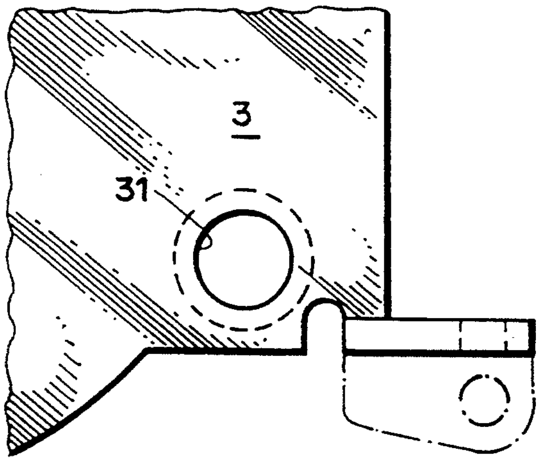

A variation of these latter embodiments consists in disposing the attachment elements directly on back 3 of watchcase 1, as shown in FIGS. 14A and 14B for a design having wing-lugs produced by bending back two extensions of back 3.

Figure 15:
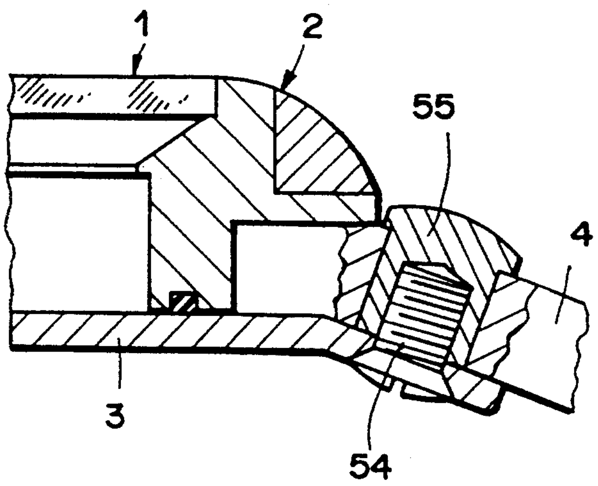
FIG. 15 is a cross-section through another embodiment.

Still another embodiment is illustrated in FIG. 15, whereby watchband 4 can be changed without the necessity of unscrewing back 3 of watchcase 1. For this purpose, an extension of back 3 is slightly bent in order to adapt itself to the curve of the wrist; this extension is pierced by one or more holes in which one or more screws 54, co-operating with one or more tapped plugs 55, hold watchband 4, which is also perforated to receive plugs 55. The tops of the latter being visible, they will have an attractive appearance.

FIGS. 16A and 16B show still another modification of back 3, adapted to the embodiment of the attachment device illustrated in FIGS. 1A and 1B. Here back 3 is composed of three parts: a first central part 34 of generally circular shape comprising symmetrically disposed bearing surfaces 34A, pressed against by two bearing flanges 35, each comprising a bearing surface of a shape complementary to that of the counterpart bearing surface 34A and fixed to caseband 2 by means of screws 36 fitted in holes 31 in flanges 35. This particular design of back 3, described here for the first embodiment of the attachment device, may obviously be adapted and used for all the other embodiments of the watchband attachment device described.

The various embodiments of the watchcase with watchband attachment device have been described as adapted to a round watchcase. It will be readily understood that the invention may equally well be adapted to oval or square or rectangular watchcases. More generally, the inventive system may be provided for a watchcase of any shape. In certain applications where the watch is not worn on the wrist but suspended, the device may obviously be applied just as well by providing only one attachment device, connecting the watchcase to the suspension means.

For the earlier mentioned reasons of simplification of manufacturing or finishing processes, the invention is particularly well adapted to metal watchcases, specifically those of stainless steel. The additional machining operation to produce the hollow or hollows intended to receive the end of the length of watchband may easily be carried out by downward milling, using conventional automatic machines having multiple stations and linear or circular cycles. The watchcase backs, also of metal, especially stainless steel, may easily be produced in a single machining operation by stamping, possibly followed by bending in order to produce the claws, and this whatever the embodiment chosen.

Nevertheless, mainly for esthetic considerations, there is no reason why the inventive attachment system should not be used for watchcases and/or backs made of other materials, such as common or precious metals, composites, ceramics, sintered metals, or synthetic materials, for example; in this case, the advantage of the invention resides in the fact that molds or dies which are simple and easy to produce may be used.

Although several embodiments of the inventive watchcase with attachment device have been described, it is obvious that other embodiments deriving from these are possible; consequently, these other embodiments, as well as ones resulting from slight modifications of the embodiments described, are likewise covered by this specification.

The watchcase with watchband attachment device according to this invention fully meets the specified requirements, viz., to facilitate greatly the machining and finishing of the watchcase since the latter is completely symmetrical, without any projecting element, which allows it to be mounted on an automatic machining or finishing machine, resulting in an appreciably lower manufacturing cost. Moreover, some of the embodiments described make it possible to revitalize the attractiveness of watchband-watchcase attachments, which is an additional advantage of the invention. Furthermore, the attachment of the watchband is reliable, is not subject to wear and tear, and allows not only changing the watchband easily but even changing the kind of watchband, going from a plastic watchband to a leather one or a metal one, or vice versa, and even using watchbands of conventional design.

What is claimed is:

1. A method of making a watch having a watchcase including a caseband and a watchcase back, the watch further comprising a watchband having a first part and a second part, the method comprising the steps of:

forming said caseband in a single operation, without any projecting elements;

forming, at opposite ends of said caseband, first attachment means for attaching said watchband to said caseband;

forming a groove adapted to receive a gasket in a bottom portion of said caseband;

blanking a piece of sheet metal of substantially uniform thickness in a predetermined shape to form said watchcase back, said watchcase back having a substantially uniform thickness;

forming, at opposite ends of said watchcase back, second attachment means for attaching said watchband to said caseband;

forming, at one end of each of the first and second parts of said watchband, third attachment means for attaching said watchband to said caseband;

placing a watch movement inside said caseband;

attaching said third attachment means to said second attachment means; and attaching said caseband to said watchcase back thereby securing said watch movement and said watchband in said watchcase.

2. The method of claim 1, wherein the step of forming said first attachment means comprises the step of forming two hollows disposed on two annular portions of the bottom portion of said caseband;

the step of forming said second attachment means comprises the step of forming two hollows at the opposite ends of said watchcase back; and the step of forming said third attachment means comprises the step of forming, at the end of each of the first and second parts of said watchband, a shape corresponding to said first attachment means and a protuberance corresponding to said second attachment means, said protuberance adapted to be received by said hollows of said second attachment means.

3. The method of claim 1, wherein the step of forming said first attachment means comprises the step of forming two hollows disposed on two annular portions of the bottom portion of said caseband;

the step of forming said second attachment means comprises the step of forming two hollows disposed at the opposite ends of said watchcase back; and the step of forming said third attachment means comprises the steps of forming, at the end of each of the first and second parts of said watchband, a shape corresponding to said first attachment means and an intermediate part, and fixing said intermediate part on said end of each of the first and second parts of the watchband, said intermediate part comprising a claw adapted to be received by said hollows of said second attachment means.

4. The method of claim 1, wherein the step of forming said first attachment means comprises the step of forming two hollows disposed on two annular portions of the bottom portion of said caseband;

the step of forming said second attachment means comprises the step of bending opposite ends of said watchcase back to form claws; and the step of forming said third attachment means comprises the step of forming, at the end of each of the first and second parts of the watchband, a shape corresponding to said first attachment means and a notch, each notch adapted to receive one of said claws, and the step of fixing a reinforcing member on said end of each of the first and second parts of the watchband.

5. The method of claim 1, wherein the step of forming said first attachment means comprises the step of forming two hollows disposed on two annular portions of the bottom portion of said caseband;

the step of forming said second attachment means comprises the step of forming two hollows disposed at the opposite ends of said watchcase back; and the step of forming said third attachment means comprises the steps of forming, at the end of each of the first and second parts of said watchband, a shape corresponding to said first attachment means, forming notches at the end of each of the first and second parts of said watchband on a face directed to the watchcase back, and fixing an intermediate part to each end, said intermediate part comprising a first claw adapted to be received by said notches and a second claw adapted to be received by said hollows of said second attachment means.

6. The method of claim 1, wherein the step of forming said first attachment means comprises the step of forming two hollows disposed on two annular portions of the bottom portion of said caseband, each of said hollows comprising a stepped portion; and the step of forming said third attachment means comprises the step of forming, at the end of each of the first and second parts of said watchband, a shape corresponding to said first attachment means and a protuberance, said protuberance adapted to be received by said stepped portion.

7. The method of claim 1, wherein the step of forming said first attachment means comprises the step of forming two hollows disposed on two annular portions of the bottom portion of said caseband, each of said hollows comprising a stepped portion; and the step of forming said third attachment means comprises the steps of forming, at the end of each of the first and second parts of said watchband, a shape corresponding to said first attachment means, and fixing an intermediate part to an upper portion of the end of each of the first and second parts of the watchband, said intermediate part having a claw adapted to be received by said stepped portion.

8. The method of claim 1, wherein the step of forming said first attachment means comprises the step of forming two hollows disposed on two annular portions of the bottom portion of said caseband;

the step of forming said second attachment means comprises the steps of bending opposite ends of said watchcase back away from said caseband to form extension members, and forming a hole in each of said extension members adapted to receive at least one screw cooperating with a corresponding plug; and the step of forming said third attachment means comprises the step of forming, at the end of each of the first and second parts of said watchband, a shape corresponding to said first attachment means and at least one notch, said at least one notch adapted to receive said at least one screw and corresponding plug.

9. The method of claim 1, wherein the step of forming said first attachment means comprises the step of forming two hollows disposed on two annular portions of the bottom portion of said caseband; and the step of forming said second attachment means comprises the step of bending two extensions on each of opposite ends of said watchcase back to form wing-lugs.

10. The method of claim 1, wherein the step of forming said first attachment means comprises the step of forming two hollows disposed on two annular portions of the bottom portion of said caseband;

the step of forming said second attachment means comprises the step of fixing extension flanges to opposite ends of said watchcase back, said extension flanges being bent to form claws; and the step of forming said third attachment means comprises the step of forming, at the end of each of the first and second parts of said watchband, a shape corresponding to said first attachment means and notches adapted to receive said claws.

11. The method of claim 10, wherein the step of forming said second attachment means further comprises the step of forming an aperture in each of the extension flanges, said aperture adapted to receive a screw for fixing said extension flanges to said watchcase back.

12. The method of claim 1, wherein the step of forming said second attachment means comprises the steps of fixing a circular bar to the bottom portion of said caseband, and sandwiching the end of each of the first and second parts of the watchband between said circular bar and said caseband.

13. The method of claim 12, wherein the step of forming said second attachment means further comprises the step of forming at least one claw on said circular bar, and the step of forming said third attachment means comprises the step of forming, at the end of each of the first and second parts of said watchband, a shape corresponding to said first attachment means and at least one notch, said at least one notch adapted to receive said at least one claw of said second attachment means.

14. The method of claim 12, wherein the step of forming said second attachment means further comprises the step of forming an aperture in said circular bar, and the step of forming said third attachment means comprises the step of forming, at the end of each of the first and second parts of said watchband, a shape corresponding to said first attachment means and a protuberance, said protuberance adapted to be received by said aperture in said circular bar.

15. The method of claim 1, wherein the step of forming said first attachment means comprises the step of forming two hollows disposed on two annular portions of the bottom portion of said caseband;

the step of forming said second attachment means comprises the step of bending opposite ends of said watchcase back to form claws; and the step of forming said third attachment means comprises the step of forming, at the end of each of the first and second parts of said watchband, a shape corresponding to said first attachment means and notches adapted to receive said claws.

16. The method of claim 15, further comprising the step of fixing a covering plate to the end of each of the first and second parts of the watchband, said covering plate including a bent portion adapted to be received by said hollows.

17. The method of claim 15, further comprising the step of seating an intermediate attachment part in each of said hollows, each of said attachment parts being secured by said claws and received in said notches, each of said intermediate attachment parts comprising a cord-lug.

18. The method of claim 15, further comprising the step of seating an intermediate attachment part in each of said hollows, each of said attachment parts being secured by said claws and received in said notches, each of said intermediate attachment parts comprising two horn members.

* * * * *